(12) United States Patent
Amagasaki

(10) Patent No.: US 8,116,523 B2
(45) Date of Patent: Feb. 14, 2012

(54) ON-VEHICLE IMAGE PROCESSING APPARATUS

(75) Inventor: Junko Amagasaki, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 812 days.

(21) Appl. No.: 12/219,432

(22) Filed: Jul. 22, 2008

(65) Prior Publication Data

US 2009/0028388 A1   Jan. 29, 2009

(30) Foreign Application Priority Data

Jul. 24, 2007   (JP) .................................. 2007-192277

(51) Int. Cl.
*G06K 9/00* (2006.01)

(52) U.S. Cl. ........ 382/103; 382/104; 382/190; 340/901; 340/903; 340/435; 340/436; 340/425.5; 340/937; 701/23; 701/200; 701/301; 348/148; 348/149

(58) Field of Classification Search .................. 328/103, 328/104, 109; 340/901, 903, 435, 436, 425.5, 340/937; 701/23, 200, 301; 348/148, 149
See application file for complete search history.

(56) References Cited

U.S. PATENT DOCUMENTS

| | | | | |
|---|---|---|---|---|
| 4,970,653 A | * | 11/1990 | Kenue | 701/301 |
| 5,309,137 A | * | 5/1994 | Kajiwara | 340/436 |
| 5,424,952 A | * | 6/1995 | Asayama | 701/200 |
| 5,448,484 A | * | 9/1995 | Bullock et al. | 701/117 |
| 5,555,312 A | * | 9/1996 | Shima et al. | 382/104 |
| 5,557,323 A | * | 9/1996 | Kajiwara | 348/140 |
| 5,661,472 A | * | 8/1997 | Koshizawa | 340/901 |
| 5,689,249 A | * | 11/1997 | Sakamoto et al. | 340/901 |
| 5,892,855 A | * | 4/1999 | Kakinami et al. | 382/291 |
| 5,929,784 A | * | 7/1999 | Kawaziri et al. | 340/903 |
| 5,949,331 A | * | 9/1999 | Schofield et al. | 340/461 |
| 6,307,484 B1 | * | 10/2001 | Sasaki et al. | 340/903 |

(Continued)

FOREIGN PATENT DOCUMENTS

JP   2712809   10/1997

(Continued)

OTHER PUBLICATIONS

Japanese Office Action Dated Nov. 25, 2011, with partial English translation.

*Primary Examiner* — Vikkram Bali
*Assistant Examiner* — Julian Brooks
(74) *Attorney, Agent, or Firm* — McGinn IP Law Group, PLLC

(57) ABSTRACT

An on-vehicle image processing apparatus includes: an image taking apparatus for taking an image of a forward view of a vehicle; an edge detection section for generating a detection image data based on the image data; and a feature point detection section for detecting at least one feature point based on the detection image data. The feature point detection section categorizes the at least one feature point into a lane division line feature point, a branch feature point, and a dead end and obstacle feature point. The detection image data includes a lane division line detection scanning region set in a near region from the vehicle, a branch detection scanning region set in a middle region from the vehicle, and a dead end and obstacle detection scanning region set in a far region from the vehicle. The amount of scanning process can be reduced.

13 Claims, 13 Drawing Sheets

U.S. PATENT DOCUMENTS

| | | | |
|---|---|---|---|
| 6,477,260 B1 * | 11/2002 | Shimomura | 382/106 |
| 6,631,324 B2 * | 10/2003 | Okamura et al. | 701/301 |
| 6,842,189 B2 * | 1/2005 | Park | 348/148 |
| 6,961,661 B2 * | 11/2005 | Sekiguchi | 701/301 |
| 6,985,075 B2 * | 1/2006 | Takeda | 340/435 |
| 6,990,216 B2 * | 1/2006 | Yamamura | 382/106 |
| 7,257,478 B2 * | 8/2007 | Sugano | 701/96 |
| 7,362,883 B2 * | 4/2008 | Otsuka et al. | 382/104 |
| 7,437,243 B2 * | 10/2008 | Fujimoto | 701/300 |
| 7,623,681 B2 * | 11/2009 | Miyahara | 382/104 |
| 7,755,508 B2 * | 7/2010 | Watanabe et al. | 340/903 |

FOREIGN PATENT DOCUMENTS

| | | |
|---|---|---|
| JP | 2000-62636 | 2/2000 |
| JP | 2003-81037 | 3/2003 |
| JP | 2003-308534 | 10/2003 |
| JP | 2005-4370 | 1/2005 |
| JP | 2006-344133 | 12/2006 |

* cited by examiner

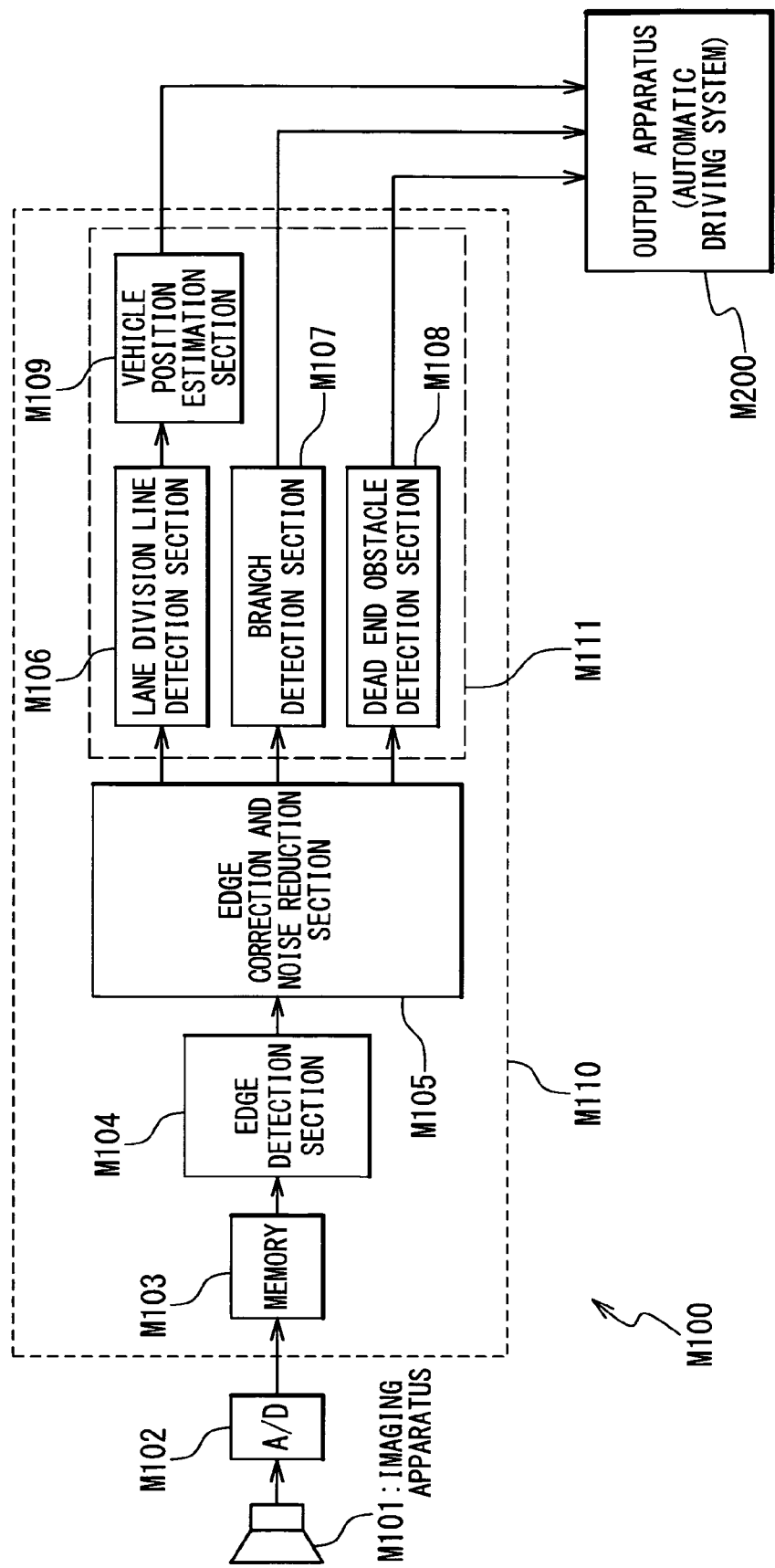

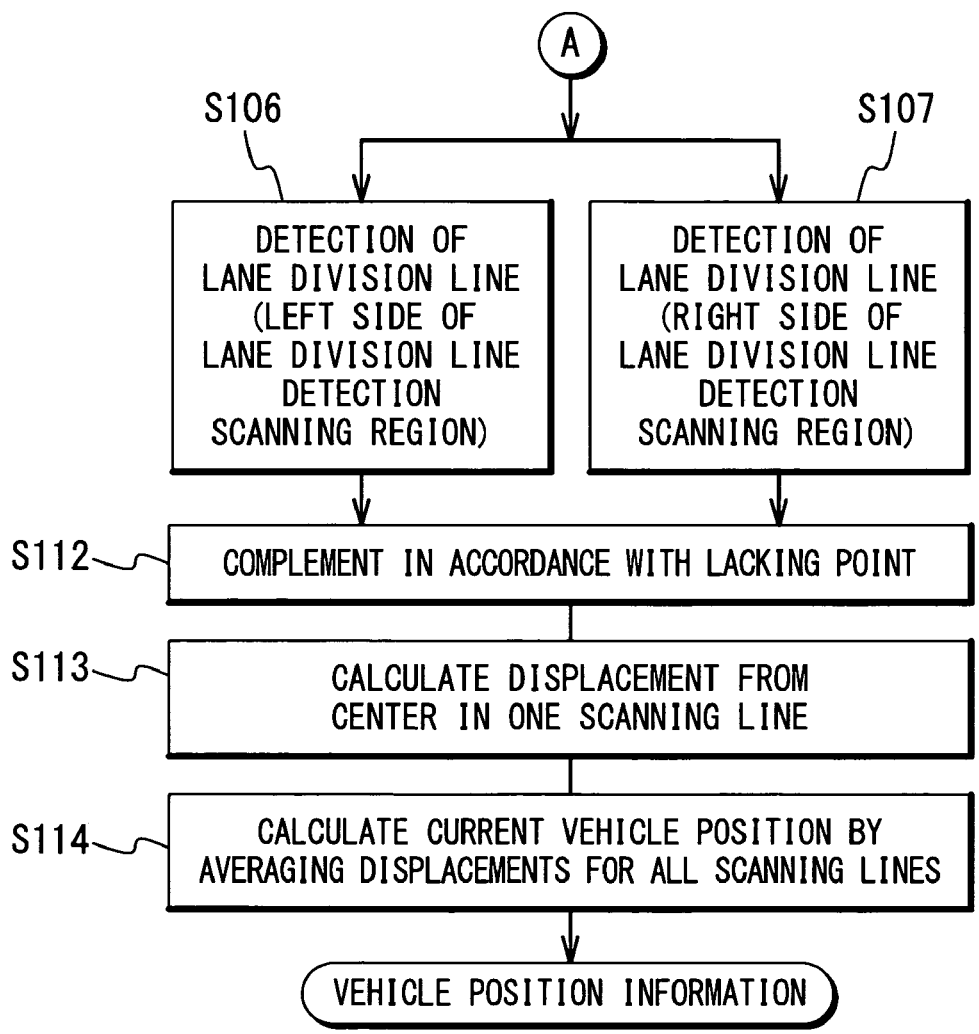

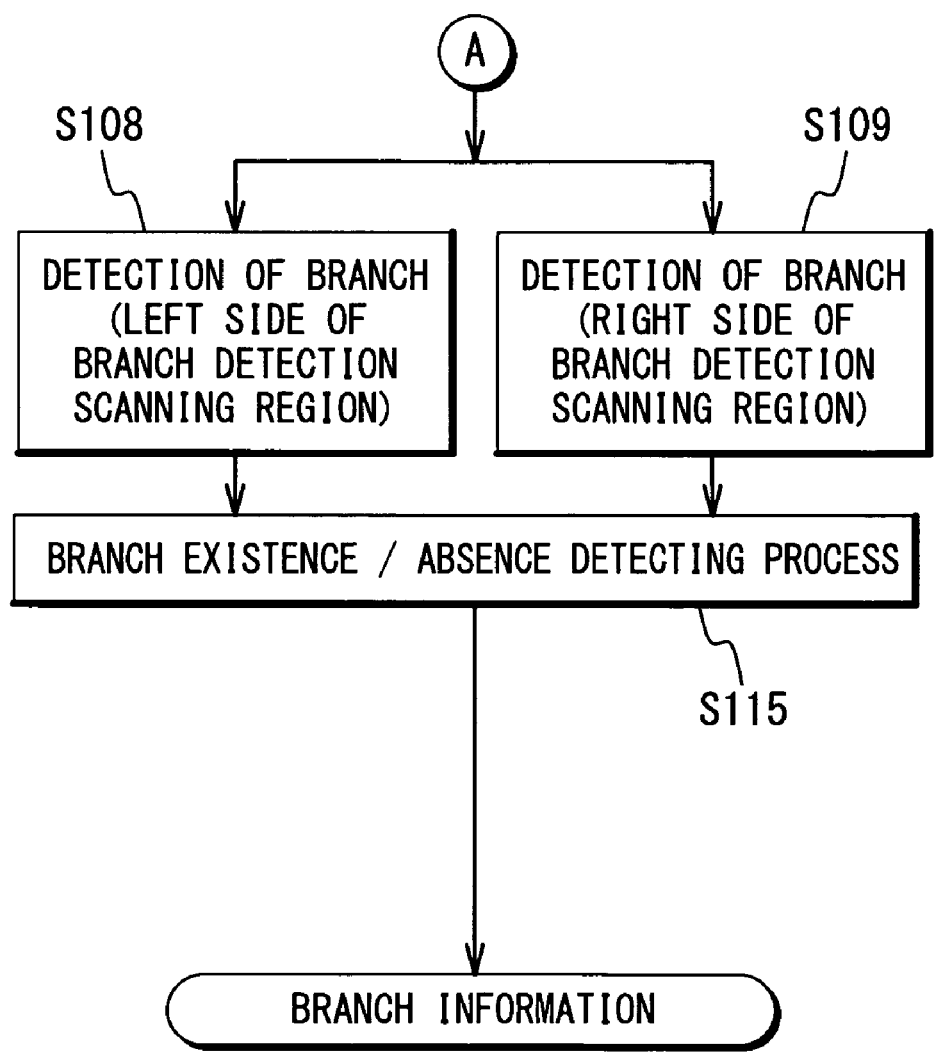

SMOOTHING FILTER

| 1 | 1 | 1 |
|---|---|---|
| 1 | 1 | 1 |
| 1 | 1 | 1 |

LAPLACIAN FILTER

| -1 | -1 | -1 |
|----|----|----|
| -1 | 8  | -1 |
| -1 | -1 | -1 |

PIXEL DATA AFTER EDGE POSITION IS DETECTED
BASED ON FIXED TEMPLATE
(CLOSEUP OF AREA INDICATED BY SQUARE)

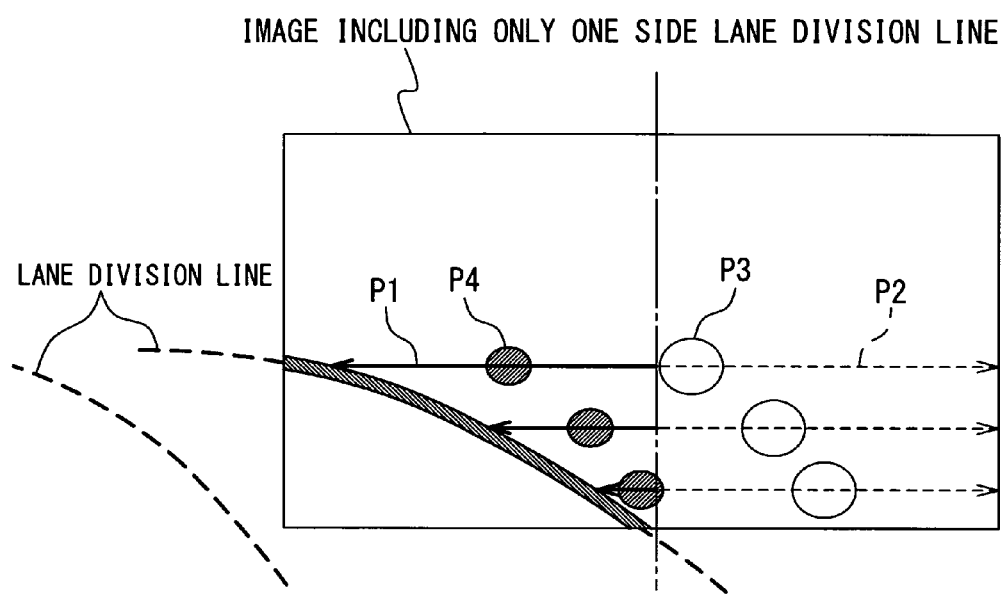

ON-VEHICLE IMAGE PROCESSING APPARATUS

INCORPORATION BY REFERENCE

This patent application is based on Japanese Patent Application No. 2007-192277. The disclosure of the Japanese Patent Application is incorporated herein by reference.

BACKGROUND OF THE INVENTION

1. Field of the Invention

The present invention relates to an image processing apparatus installed on a vehicle and is designed to take an image of a forward view of the vehicle.

2. Description of Related Art

Image processing apparatuses which are installed on vehicles have been developed. Such apparatuses can be applied to automatic driving techniques. As for an image processing apparatus, the following three characteristics are required.

Firstly, in order to recognize the lane on which the vehicle travels, it is necessary to take an image of the front view of the vehicle by a camera such as the CCD (Charge Coupled Device) or the CMOS (Complementary Metal Oxide Semiconductor) image sensor and perform processing of the image in real time.

Secondly, a correct recognition of the lane is required for the safe driving. Therefore, the input image data of the lane is required to have a feature that brings about less error in the image recognition.

Thirdly, it is required to extract information of edges of the lane marking drawn on the surface of the lane in the front view image. In such information, the position of a lane division line on the lane surface, the existence or absence of a branch of a lane, or the existence or absence of a dead end or an obstacle is represented, for example.

Here, some examples of image processing apparatuses for vehicles are introduced.

Japanese Laid Open Patent Application JP-P 2003-308534A describes a white line recognition apparatus. In this white line recognition apparatus, a forward road surface image including a running lane is imaged, and the road surface image is laterally scanned. By detecting an up-edge where the intensity (namely, brightness, concentration or value of a pixel) of the image is relatively increased by more than a predetermined value and a down-edge where the intensity of the image is relatively decreased by more than a predetermined value, a bright portion caused by a white line on a road surface is extracted. At this time, white line position candidate points which represent side edge portion of the lane is determined for each longitudinal position of the road image. In this case, when only one pair edge composed of an up-edge and a down-edge that correspond to the bright portion is detected at the same position in the longitudinal direction of the road surface image, a point having a predetermined relative position preset for the pair edge is defined as the white line position candidate point. Also, when a plurality of pair edges are detected, in accordance with the array of the plurality of pair edges, a point having a predetermined relative position preset for the plurality of pair edges is defined as the white line position candidate point. In this way, in the white line recognition apparatus, even in the road portion in which the plurality of white lines are arrayed, a white line position candidate point when the white line of the road portion is assumed to be the single road portion is obtained.

Also, Japanese Patent Publication No. 2712809 describes a vehicle obstacle detection apparatus. In this vehicle obstacle detection apparatus, only a horizontal edge and a vertical edge which extend longer as they exist in the lower portion of a screen from an input image are extracted, and an area surrounded by the horizontal and vertical edges are recognized as an obstacle. In this construction, a distance measuring system can be constructed by using only one camera.

SUMMARY

However, in on-vehicle image processing apparatuses (in particular, white line recognizing apparatuses) exemplified above, for detecting the lane division line, the branch, the dead end and the obstacle, fixed templates for detecting them are prepared and the entire region of the image is scanned for checking the matching of the image to the templates. In this case, since the entire region is scanned, there is a problem that the number of the processing steps of scanning becomes large, correspondingly to the frame size of the image.

In a first aspect of the present invention, an on-vehicle image processing apparatus includes: an image taking apparatus configured to generate image data by taking an image of a forward view of a vehicle; an edge detection section configured to generate a detection image data including pixels of m rows and n columns (m and n are integers more than 2) based on the image data; and a feature point detection section configured to detect at least one feature point based on the detection image data and output the at least one feature point to an output apparatus. The feature point detection section categorizes the at least one feature point into a lane division line feature point indicating a point on a lane division line, a branch feature point indicating a branch of a lane, and a dead end and obstacle feature point indicating a dead end of a lane or an obstacle on a lane. The detection image data includes a lane division line detection scanning region set for detecting the lane division line feature point, a branch detection scanning region set for detecting the branch feature point, and a dead end and obstacle detection scanning region set for detecting the dead end and obstacle feature point. The distance between a vehicle loading the image taking apparatus and a position on a lane corresponding to a pixel in the detection image data becomes shorter from a first row to a m-th row of the detection image data. The dead end and obstacle detection scanning region is set in pixels positioned from the first row to a m1-th row of the detection image data, the branch detection scanning region is set in pixels positioned from the m1-th row to a m2-th row of the detection image data, and the lane division line detection scanning region is set in pixels positioned from the m2-th row to the m-th row of the detection image data, wherein $1<m1<m2<m$.

As mentioned above, in an on-vehicle image processing apparatus (M100) according to an embodiment of the present invention, a scanning region dedicated to each of the feature points (a lane division line, a branch, a dead end or an obstacle) of the road is set for a detection image data (image data for detecting feature points). Thus, the number of the steps of image scanning process can be reduced.

Also, in an on-vehicle image processing apparatus (M100) according to an embodiment of the present invention, the characteristic of the image, namely, the perspective in which the near side appears large and the far side appears small is used for determining the scanning regions respectively correspond to the types of targets on a road to be detected. Thus, it is possible to reduce the influence of noise in the scanning region, so that it is possible to reduce errors in the detection of feature points on the road.

Also, in an on-vehicle image processing apparatus (M100) according to an embodiment of the present invention, a lane division line detection scanning region (A101) is set at the nearest side (the lower side of the image region). Thus, even when the vehicle position is deviated from the lane or when the vehicle runs through a curve, the lane division line can be imaged at least partially. Hence, it becomes easy to carry out the process for calculating the vehicle position even in such cases.

Also, in an on-vehicle image processing apparatus (M100) according to an embodiment of the present invention, the far portion in the image is set as the dead end and obstacle detection scanning region. Therefore, the existence or absence of a dead end or an obstacle can be detected earlier than the detection of the branch. Thus, it becomes easy to carry out the judgment, such as a speed control, a direction control and the like, when the output apparatus (M200) controls the driving of the vehicle.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 1 shows a configuration of an on-vehicle image processing apparatus;

FIG. 2B is a flowchart showing an operation of an on-vehicle image processing apparatus;

FIG. 2C is a flowchart showing an operation of an on-vehicle image processing apparatus;

FIG. 7C is a view describing an effect when the step S112 is executed.

DESCRIPTION OF THE PREFERRED EMBODIMENTS

Figure 2A:
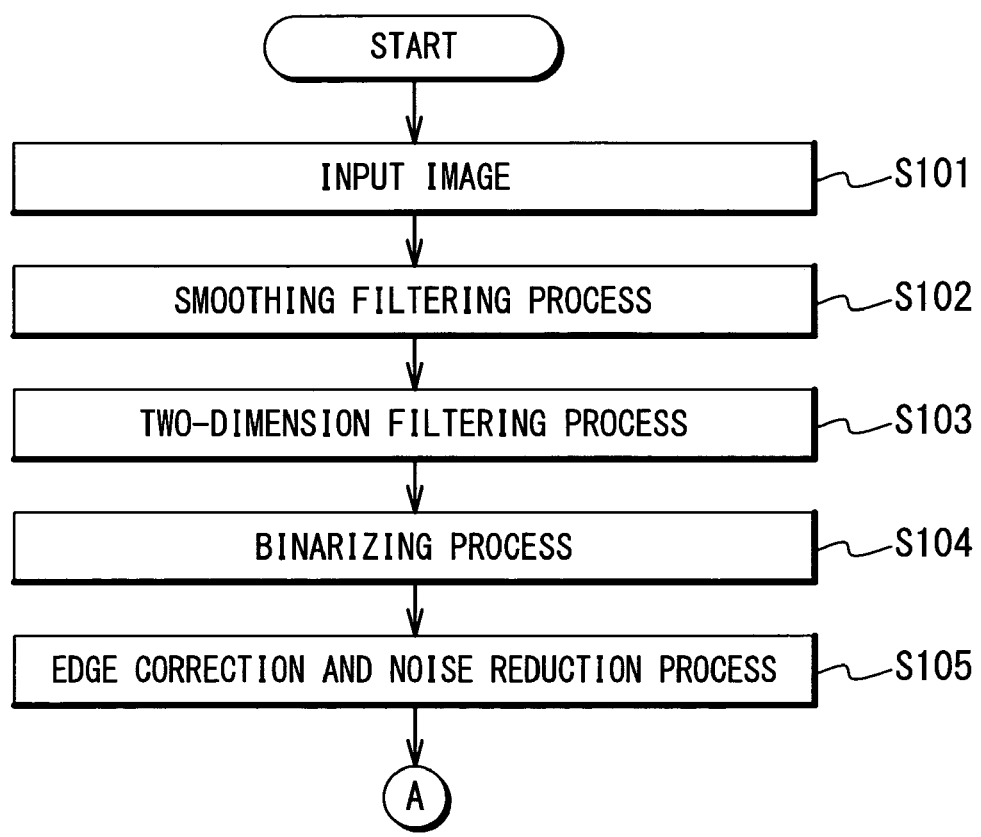
FIG. 2A is a flowchart showing an operation of an on-vehicle image processing apparatus.
Figure 2D:
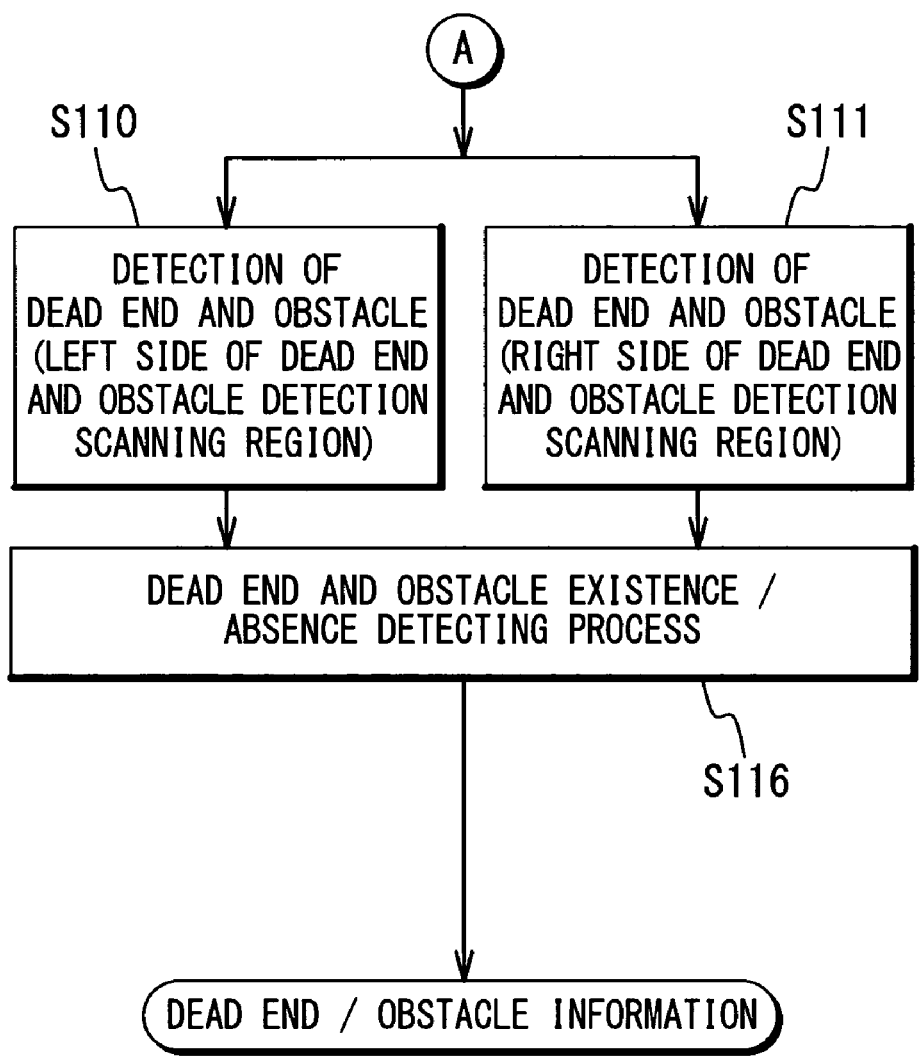
FIG. 2D is a flowchart showing an operation of an on-vehicle image processing apparatus.

Hereinafter, an on-vehicle image processing apparatus according to embodiments of the present invention will be described with reference to the attached drawings.

[Configuration]

FIG. 1 shows a configuration of an on-vehicle image processing apparatus M100 according to an embodiment of the present invention. The on-vehicle image processing apparatus M100 is installed on a vehicle together with the other equipment using the result of image processing like an automatic driving system M200. The on-vehicle image processing apparatus contains an imaging apparatus M101, an analog to digital (A/D) converter M102 and an image processing apparatus M110.

The imaging apparatus M101 has a camera, such as the CCD or CMOS image sensor, and is set in the forward view of the vehicle. The A/D converter M102 is connected to the imaging apparatus M101 and the image processing apparatus M110. The image processing apparatus M110 is a computer, and is realized by hardware exemplified by an electronic circuit and software exemplified by a computer program.

The image processing apparatus M110 contains a memory M103, an edge detection section M104, an edge correction and noise reduction section M105 and a feature point detection section M111. The feature point detection section M111 contains a lane division line detection section M106, a branch detection section M107, a dead end and obstacle detection section M108 and a vehicle position estimation section M109. The memory M103 is connected to the A/D converter M102 and the edge detection section M104. The edge detection section M104 is connected to the edge correction and noise reduction section M105. The edge correction and noise reduction section M105 is connected to the lane division line detection section M106, the branch detection section M107 and the dead end and obstacle detection section M108. The lane division line detection section M106 is connected to the vehicle position estimation section M109. The vehicle position estimation section M109, the branch detection section M107 and the dead end and obstacle detection section M108 are connected to an output apparatus like an automatic driving system M200.

[Operation]

FIGS. 2A to 2D are flowcharts showing operations of the on-vehicle image processing apparatus M100 shown in FIG. 1.

The imaging apparatus M101 takes an image of a forward view of the vehicle on a road by using a camera and generates an analog image data representing the image ahead of the vehicle from the vehicle. The A/D converter M102 performs an analog to digital conversion on the analog image data to generate digital image data and stores the digital image data in the memory M103 (Step S101). This digital image data includes pixel data corresponding to pixels arranged in a matrix of m rows and n columns, which represent the forward view from the vehicle. Here, m and n are integers of 3 or more.

The edge detection section M104 generates an two-dimensional space filtered image data by performing a two-dimensional space filtering process on the m rows and n columns pixels of the digital image data stored in the memory M103.

In the "two-dimensional space filter," the filtering process applied to a focused pixel is performed based on the information of a certain two dimensional region surrounding the focused pixel on the image. In this embodiment, in the two-dimensional space filtering process, a square or a rectangular surrounding (circumference) region is set to each of the pixels g(i, j). Then, a weight is preliminary set to each of the pixels in the surrounding region for each of the pixels. The weighted average of the intensity of the surrounding region is calculated as the filtered (recalculated or average) intensity of the center pixel f(i, j) for each of the pixels in the entire images. For example, in a case that the surrounding region is set to be a 3×3 square region, the average intensity f(i, j) is calculated by averaging the intensities of the 9 pixels g(i−1, j−1), g(i, j−1), g(i+1, i−1), g(i−1, j), g(i, j), g(i+1, j), g(i−1, j+1), g(i, j+1) and g(i+1, j+1) with their respective weights. When the image is a color image, this averaging is performed for each of the color components of the pixels for each of the m rows and n columns pixels of the digital image data.

Here, when i and j are integers that satisfy $2 \leq i \leq (m-1)$ and $2 \leq j \leq (n-1)$, respectively, the average intensity f(i, j) is represented by the following equation (1).

$$f(i, j) = \sum_{k=-1}^{1} \sum_{l=-1}^{1} g(i+k, j+l) \times M(i, j)_{kl} \quad (1)$$

Here, M(i, j) is a space filter coefficient matrix which functions as a table of weights in the circumference region for each of the pixels, and the suffixes indicate the position of each element of this matrix. The matrix M is represented by the following equation (2).

$$M(i, j) = \begin{pmatrix} m(i-1, j-1) & m(i, j-1) & m(i+1, j-1) \\ m(i-1, j) & m(i, j) & m(i+1, j) \\ m(i-1, j+1) & m(i, j+1) & m(i+1, j+1) \end{pmatrix} \quad (2)$$

Figure 3A:
FIG. 3A is a view showing a two-dimensional space filter (smoothing filter) used in an operation of an on-vehicle image processing apparatus.
Figure 3B:
FIG. 3B is a view showing a two-dimensional space filter (Laplacian smoothing filter) used in an operation of an on-vehicle image processing apparatus.

By setting various weights in the space filter coefficient matrix M(i, j), various kinds of the filtering can be achieved. As such two-dimensional space filtering processes, the smoothing filtering process (Step S102), and the Laplacian filtering process (also called as Laplacian smoothing filtering process) (Step S103) in which the 3×3 mask filters shown in FIGS. 3A, 3B are respectively used are exemplified.

At first, in the smoothing filtering process (also called as simple smoothing filtering process), the average intensity f(i, j) is calculated by:

f(i,j)={1×g(i−1,j−1)+1×g(i,j−1)+1×g(i+1,j−1)+1×g(i−1,j)+1×g(i,j)+1×g(i+1,j)+1×g(i−1,j+1)+1×g(i,j+1)+1×g(i+1,j+1)}/9.

The coefficients located before each value g(x, y) is represented by the following equation (3) in the form of the space filter coefficient matrix M(i, j).

$$M(i, j) = \begin{pmatrix} 1 & 1 & 1 \\ 1 & 1 & 1 \\ 1 & 1 & 1 \end{pmatrix} \times \frac{1}{9} \quad (3)$$

Next, the Laplacian filtering process determines the difference between the intensity f(i, j) represented by the focused pixel g(i, j) and the intensities f(i−1, j−1), f(i, j−1), f(i+1, j−1), f(i−1, j), f(i+1, j), f(i−1, j+1), f(i, j+1) and f(i+1, j+1) that are represented by the 8 surrounding pixels g(i−1, j−1), g(i, j−1), g(i+1, j−1), g(i−1, j), g(i+1, j), g(i−1, j+1), g(i, j+1) and g(i+1, j+1), respectively, which are the pixels around the focused pixel. At this time, the space filter coefficient matrix M(i, j) is represented by the equation (4).

$$M(i, j) = \begin{pmatrix} -1 & -1 & -1 \\ -1 & 8 & -1 \\ -1 & -1 & -1 \end{pmatrix} \quad (4)$$

The edge detection section M104 performs a binarization process on the m rows and n columns pixels of the two-dimensional space filtered image data to generate the binarized image data (Step S104).

In this binarization process, the first value and the second value, for example "1" and "0," constituting a binary digit is set. One of "1" and "0" is set to indicate the binary number corresponding to the black when the calculated intensity of each of the m rows and n columns pixels of the two-dimensional space filtered image data is below a predetermined threshold value, and other of "1" and "0" is set to indicate the binary number corresponding to the white when the calculated intensity of each of them is above the predetermined threshold value. As a result, the binarized image data composed of pixels each of which has either "1" or "0" value is generated. The edge detection section M104 outputs the binarized image data to the edge correction and noise reduction section M105 as a noise detection image data.

The edge correction and noise reduction section M105 generates a feature point detection image data by performing an edge correction and noise reduction on the m rows and n columns pixels of the noise detection image data (Step S105).

In this edge correction and noise reduction process, each of the numbers of the binary numbers "0" and "1" represented by the surrounding pixels around the focused pixel are counted for each of the m rows and n columns pixels of the noise detection image data, respectively. And then, the binary number of each of the pixels is replaced by a new binary number in accordance with the number obtained by counting "0" and "1" around the pixel, the proportion of the number of "0" pixels to the "1" pixels, and the matching result of the arrangement of the "0" and "1" pixels with a preset pattern. This process is performed on all pixels.

As such a condition, the following three items can be exemplified.

Condition 1: When the binary number represented by the focused pixel is the black "1" and when the 4 pixels or more among the surrounding pixels have the binary number representing the white "0", the binary number represented by the focused pixel is replaced from the black "1" to the white "0".

Condition 2: When the binary number represented by the focused pixel is the white "0" or the black "1" and when one, two or three pixels among the surrounding pixels have the binary number representing the white "0", the binary number of the focused pixel is kept in the current value.

Condition 3: When the binary number represented by the focused pixel is the white "0" or the black "1" and when all of the surrounding pixels have the binary number representing the black "1", the binary number represented by the focused pixel is replaced with the black "1".

The foregoing condition is one example, and other kind of condition can be used to the edge correction and noise reduction process.

As for the feature point detection image data obtained by the processes at the steps S102 to S105, its contrast is enhanced and the noise is suppressed as compared with the digital image data obtained at the step S101. Since the contrast is enhanced, the edge is enhanced, which enables the feature point on the road to be easily extracted. The edge correction and noise reduction section M105 outputs the feature point detection image data to the feature point detection section M111.

Figure 4A:
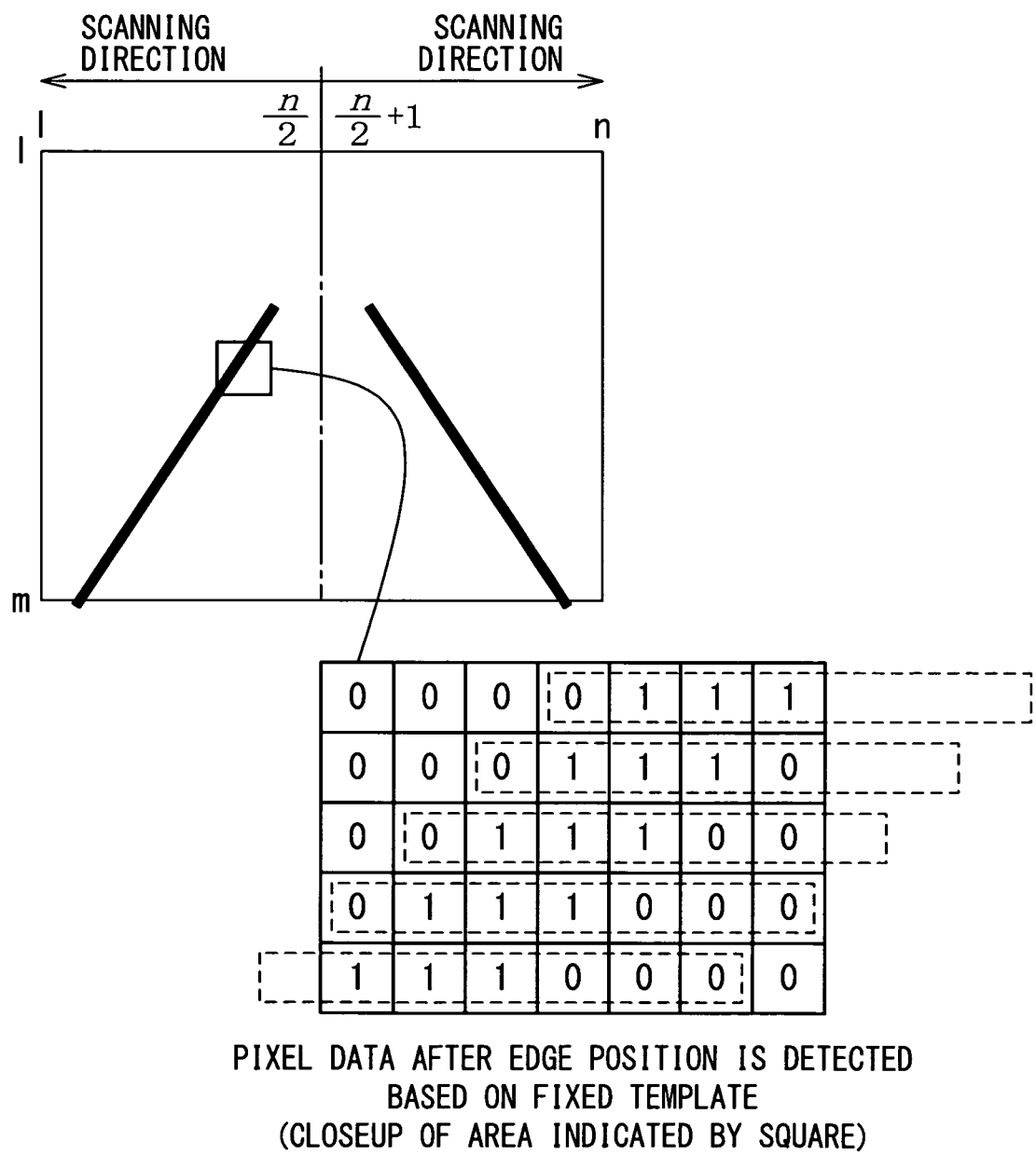
FIG. 4A is a view describing a detection of a lane division line feature point, as an operation of an on-vehicle image processing apparatus.

The feature point detection section M111 scans the m rows and n columns pixels of the feature point detection image data by one row at a time as a scanning line, and detects the pixels having the binary number "1" representing the black from the m rows and n columns pixels, and detects feature points of the lane in accordance with the pixels representing the black "1." For example, in the case of the white line, as shown in FIG. 4A, the pixel representing the black "1" among the m rows and n columns pixels of the feature point detection image data represents a white line.

The feature point is categorized into a plurality of types, exemplified by: a lane division line feature point representing a line painted on a road surface for dividing adjacent lanes, typically a white line; a branch feature point representing a branch of the road; and a dead end and obstacle feature point representing that the road leads to a dead end or the road is blocked by an obstacle.

In the explanation in embodiments of the present invention, instead of the lane division line which is typically a white line, other kinds of lane marking can be processed in a same manner. Such lane marking includes a yellow line representing that the vehicle lane is in a no-overtaking zone, and the characters representing a traffic rule such as the legal speed, a path direction and the like.

Figure 4B:
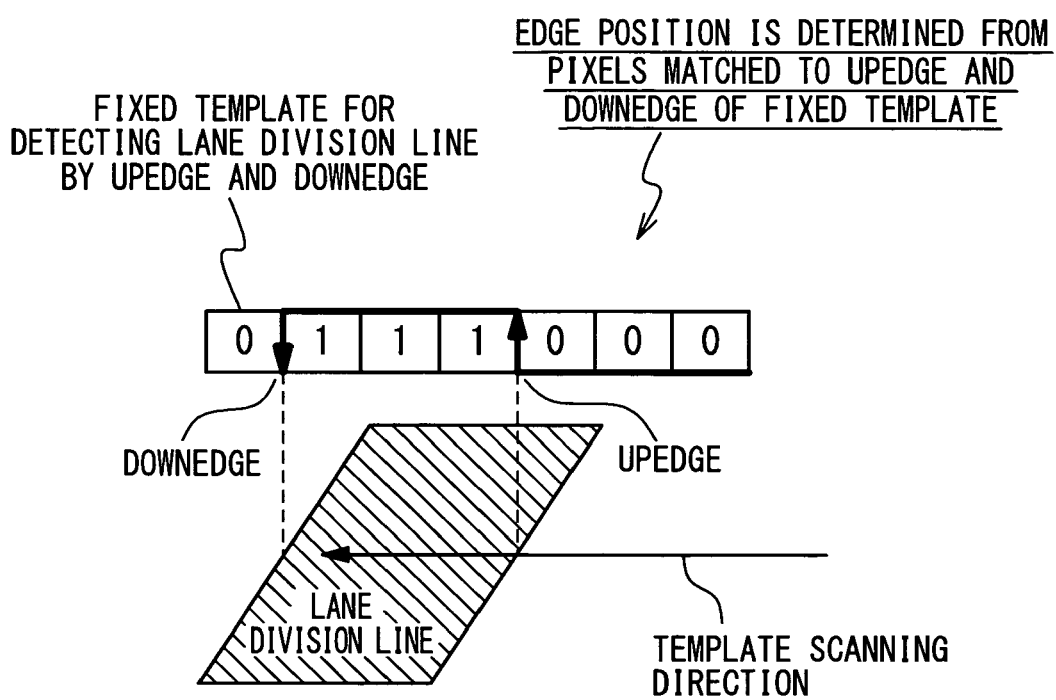
FIG. 4B is a view describing a detection of a lane division line feature point, as an operation of an on-vehicle image processing apparatus.

The feature point detection section M111 scans the m rows and n columns pixels of the feature point detection image data by one row at a time. At this process, the pixels from the (n/2)-th column to the first column are scanned in this order, and reversely, the pixels from the (n/2)-th column to the n-th column are scanned in this order, as shown in FIGS. 4A and 4B. Along this scanning path, when the binary value of the scanned pixel is changed from the white "0" represented by a first pixel group to the black "1" represented by a second pixel group, the boundary between the first pixel group "0" and the second pixel group "1" is referred to as an up-edge. Similarly, when the binary value is changed from the black "1" represented by the second pixel group to the white "0" represented by a third pixel group along the scanning path, the boundary between the second pixel group "1" and the third pixel group "0" is referred to as a down-edge.

The lane division line detection section M106, the branch detection section M107 and the dead end and obstacle detection section M108 in the feature point detection section M111 include a fixed template for a lane division line detection (not shown), a fixed template for a branch detection (not shown) and a fixed template for a dead end and obstacle detection (not shown), respectively. The lane division line detection section M106 detects a lane division line based on the preset lane division line feature point pattern represented by the fixed template for lane division line detection. The branch detection section M107 detects a branch based on the preset branch feature point pattern represented by the fixed template for branch detection. And the dead end and obstacle detection section M11 detects dead end and obstacle based on the preset dead end and obstacle feature point pattern represented by the fixed template for dead end and obstacle detection. Each of the preset lane division line feature point pattern, the preset branch feature point pattern and the preset dead end and obstacle feature point pattern is composed of a pair of the up-edge and the down-edge.

Figure 5:
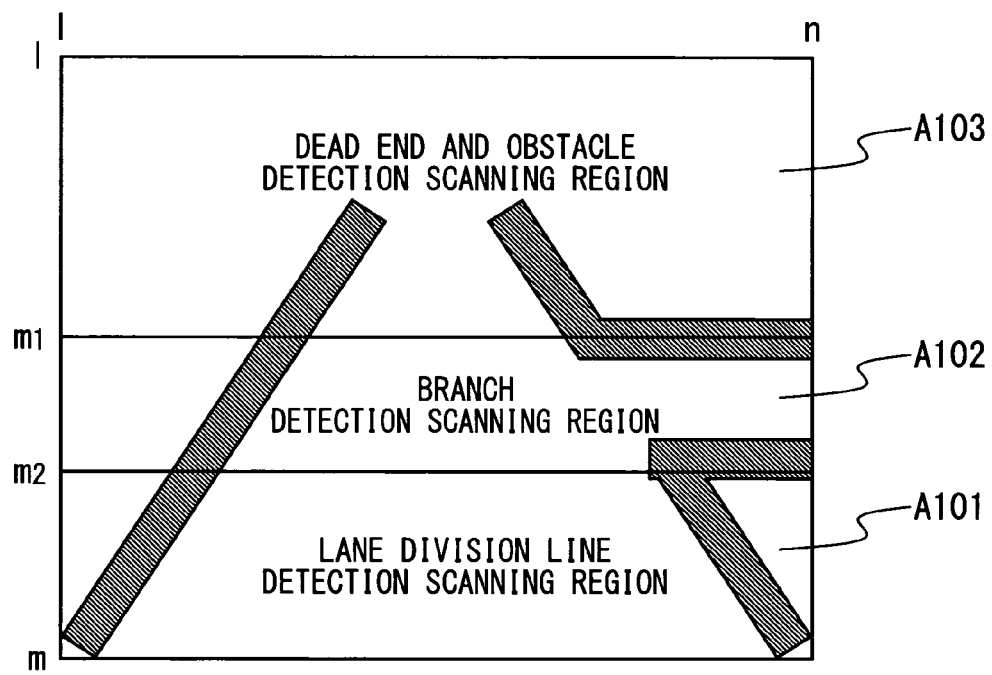
FIG. 5 is a view describing an operation of an on-vehicle image processing apparatus, showing a lane division line detection scanning region A101, a branch detection scanning region A102 and a dead end and obstacle detection scanning region A103 of a feature point detecting image data.

As shown in FIG. 5, the feature point detection image data includes a lane division line detection scanning region A101, a branch detection scanning region A102 and a dead end and obstacle detection scanning region A103. In the m rows and n columns pixels of the feature point detection image data, the distance between a position on a lane shown in the image and the vehicle corresponds to the longitudinal position of that position on the image. The distance between the vehicle and a position on a lane corresponding to a pixel in the image becomes shorter from the first row to the m-th row of the image. Namely, the distance between the vehicle and the position having smaller k on the image is larger than the distance between the vehicle and the position having larger k on the image, when the value k is counted up from the top (k=1) to the bottom (k=m) of the image. Also, the relation 1<m1<m2<m is assumed. In this case, the dead end and obstacle detection scanning region A103 corresponds to a far region from the vehicle and set in the pixels from the first row to the m1-th row, among the m rows and n columns pixels of the feature point detection image data. The branch detection scanning region A102 correspond to the middle region from the vehicle and set in pixels from the (m1+1)-th row to the m2-th row, and the lane division line detection scanning region A101 correspond to the near region from the vehicle and set in pixels from the (m2+1)-th row to the m-th row.

The lane division line detection section M106 scans the pixels from the (m2+1)-th row to the m-th row in the lane division line detection scanning region A101, by one row at a time, from the central position of the image in the left direction. That is, the left side pixels from the (n/2)-th column to the first column are scanned in this order. At this time, the lane division line detection section M106 detects the pixel in which the binary number represents the black "1", as a candidate lane division line feature point, among the pixels from the (m2+1)-th row to the m-th row. And a pattern matching is performed for the candidate lane division line feature point by using the fixed template for a lane division line detection. In the pattern matching, when the candidate lane division line feature point "1" matches with the preset lane division line feature point pattern represented by the fixed template for a lane division line detection, the lane division line detection section M106 judges the candidate lane division line feature point as a left side lane division line feature point (Step S106).

The lane division line detection section M106 scans the pixels from the (m2+1)-th row to the m-th row in the lane division line detection scanning region A101, by one row at a time, from the central position of the image in the right direction. That is, the right side pixels from the (n/2)-th column to the n-th column are scanned in this order. At this time, the lane division line detection section M106 detects the pixel in which the binary number represents the black "1", as a candidate lane division line feature point, among the pixels from the (m2+1)-th row to the m-th row. And a pattern matching is performed for the candidate lane division line feature point by using the fixed template for a lane division line detection. In the pattern matching, when the candidate lane division line feature point "1" matches with the preset lane division line feature point pattern represented by the fixed template for a lane division line detection, the lane division line detection section M106 judges the candidate lane division line feature point as a right side lane division line feature point (Step S107).

The lane division line detection section M106 scans the pixels in the lane division line detection scanning region A101 by one row at a time, and carries out an complementation process for complementing the portion in which the lane division line feature point is not be detected (Step S112). This complementation is carried out as follows. When the lane division line detection section M106 scans the pixels in the lane division line detection scanning region A101 by one row at a time, it is assumed that, a lane division line feature point is detected in one of the left side and the right side of the lane division line detection scanning region A101, and is not detected in other one of them. In this case, in the right side or left side from which the lane division line feature point is not detected, the central pixel of the right or left half region on the lateral scanning line is complemented as a complemented lane division line feature point for complementing a lacking point of a lane division line.

For example, when the lane division line detection section M106 scans the pixels in the lane division line detection scanning region A101 by one row at a time, the right side lane division line feature point is assumed to be detected, and the left side lane division line feature point is assumed not to be detected. In this case, from the left pixels from which the left side lane division line feature point cannot be detected, the pixel on the (n/2)-th column being the central pixel is complemented as the complemented lane division line feature point. Similarly, when the lane division line detection section M106 scans the pixels in the lane division line detection scanning region A101 by one row at a time, the left side lane division line feature point is assumed to be detected, and the right side lane division line feature point is assumed not to be detected. In this case, from the right pixels from which the right side lane division line feature point cannot be detected, the pixel on the (n/2)-th column being the central pixel is complemented as the complemented lane division line feature point. By this complementation process, the points positioned on right or left lane division line but lacking in the image is complemented.

The lane division line detection section M106 sends the lane division line feature points (the left side lane division line feature point and the right side lane division line feature point), (the left side lane division line feature point and the complemented right side lane division line feature point) and (the right side lane division line feature point and the complemented left side lane division line feature point), when the pixels in the lane division line detection scanning region A101 are scanned by one row at a time, to the vehicle position estimation section M109.

The vehicle position estimation section M109 calculates the vehicle position, which is considered to indicate the position of the vehicle on the lane, as a feature point on the lane, in accordance with the lane division line feature points (the left side lane division line feature point and the right side lane division line feature point), (the left side lane division line feature point and the complemented right side lane division line feature point) and (the right side lane division line feature point and the complemented left side lane division line feature point) which are detected by one row at a time by the lane division line detection section M106.

Figure 6:
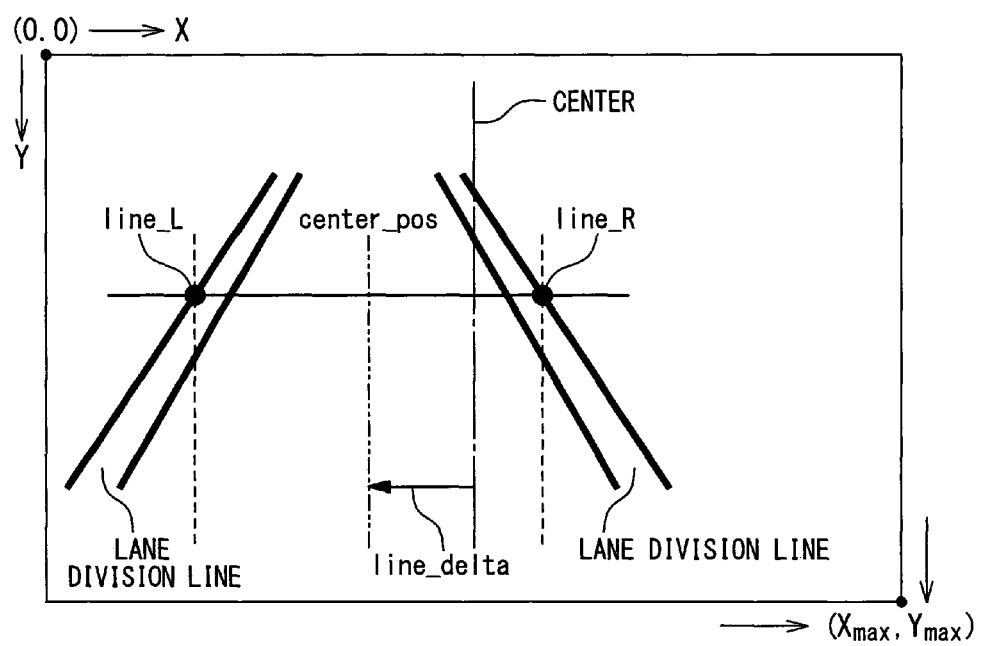
FIG. 6 is a view describing a calculation of a current vehicle position, as an operation of an on-vehicle image processing apparatus.

Specifically, as shown in FIG. 6, the coordination of the lane division line detection scanning region A101 is replaced so that the coordinate value of the pixel of the (m2+1)-th row first column are defined as (0, 0), and the coordinate value of the pixel of the m-th row n-th column is defined as (Xmax, Ymax). Also, the lateral coordinate value of the pixel corresponding to the left side lane division line feature point or complemented left side lane division line feature point is defined as line_L, and the lateral coordinate value of the pixel corresponding to the right side lane division line feature point or complemented right side lane division line feature point is defined as line_R. Namely, as shown in FIG. 6, the Line_L indicates the lane division line feature point detected by scanning left side of image, and the Line_R indicates the lane division line feature point detected by scanning right side of image.

When the current vehicle position on one scanning line is assumed to be center_pos, the vehicle position estimation section M109 calculates the current vehicle position center_pos by the following equation:

$$\text{center\_pos} = \text{line\_}L + \{(\text{line\_}R - \text{line\_}L)/2\}$$

Next, the coordinate value (0, Xmax/2) and (Ymax, Xmax/2) respectively represent the pixels of the (m2+1)-th row (n/2)-th column and the m-th rows (n/2)-th column are defined as the central position of the image on one scanning line. Then, defining the central position as CENTER, and the deviation amount from the central position CENTER with respect to the vehicle position center_pos as line_delta, the vehicle position estimation section M109 calculates the deviation amount line_delta from the central position CENTER of the image on one scanning line by the following equation:

$$\text{line\_delta} = \text{CENTER} - \text{center\_pos}$$

This calculation is performed on every scanning line between the (m2+1)-th and m-th rows in the lane division line detection scanning region A101 (Step S113).

Next, the vehicle position estimation section M109 calculates the average value of the deviation amounts line_delta from the central position CENTER that are determined for all of the scanning lines between the (m2+1)-th and m-th rows and determines the current vehicle position in accordance with the average value (Step S114).

Specifically, defining the total value of the deviation amounts line_delta from the central position CENTER with regard to all the lines between the (m2+1)-th and m-th rows as Σline_delta and the average value of the deviation amounts line_delta as frame_delta, the vehicle position estimation section M109 calculates an average value frame_delta by the following equation:

$$\text{frame\_delta} = (\Sigma \text{line\_delta}) / Y\text{max}.$$

Further, the vehicle position estimation section M109 calculates the current vehicle running position Current_CENTER indicating the current position of the vehicle by the following equation:

$$\text{Current\_CENTER} = \text{CENTER} - \text{frame\_delta}.$$

Here, if Current_CENTER>0, it is indicated that the vehicle is in the right side from the central position of the image, and if Current_CENTER<0, it is indicated that the vehicle is in the right side from the central position of the image.

Also, at the step S114, the vehicle position estimation section M109 outputs the calculated current vehicle position as the running position information to the automatic driving system M200. Or, the current vehicle position and the lane division line feature points (the right side lane division line feature point and the left side lane division line feature point) may be outputted as the running position information to the automatic driving system M200.

The branch detection section M107 scans the pixels from the (m1+1)-th row to the m2-th row in the branch detection scanning region A102, by one row at a time, from the central position of the image in the left direction. That is, the pixels from the (n/2)-th column to the first column are scanned in this order. At this time, the branch detection section M107 detects the pixel whose binary number represents the black "1", among the pixels from the (m1+1)-th row to the m2-th row, as a candidate branch feature point. The branch detection section M107 performs a pattern matching of the detected candidate branch feature point by using the fixed template for the branch detection. In the pattern matching, if the candidate branch feature point "1" matches with the preset branch feature point pattern represented by the fixed template for the branch detection, the branch detection section M107 judges the candidate branch feature point as a left branch feature point (Step S108).

The branch detection section M107 scans the pixels from the (m1+1)-th row to the m2-th row as the branch detection scanning region A102, by one row at a time, from the central position of the image in the right direction. That is, the pixels from the (n/2)-th column to the n-th column are scanned in this order. At this time, the branch detection section M107 detects the pixel whose binary number represents the black "1", among the pixels from the (m1+1)-th row to the m2-th row, as a candidate branch feature point. The branch detection section M107 performs a pattern matching of the detected candidate branch feature point by using the fixed template for the branch detection. In the pattern matching, if the candidate branch feature point "1" matches with the preset branch feature point pattern represented by the fixed template for the branch detection, the branch detection section M107 judges the candidate branch feature point as a right branch feature point (Step S109).

The branch detection section M107 generates branch information, which indicates whether the obtained branch feature point (the right branch feature point or the left branch feature point) exists on the right side from the central position of the image, or exits on the left side, or exits on both the right and left sides, or does not exist on both the right and left sides, and then outputs the branch information to the automatic driving system M200 (Step S115).

The dead end and obstacle detection section M108 scans the pixels from the first row to the m1-th row in the dead end and obstacle detection scanning region A103, by one row at a time, from the central position of the image in the left direction. That is, the pixels from the (n/2)-th column to the first column are scanned in this order. At this time, the dead end and obstacle detection section M108 detects the pixel whose binary number represents the black "1" as a candidate dead end and obstacle feature point, among the pixels from the first row to the m1-th row. The dead end and obstacle detection section M108 performs a pattern matching of the detected candidate dead end and obstacle feature point by using the fixed template for the dead end and obstacle detection. In the pattern matching, if the candidate dead end and obstacle feature point "1" matches with the preset dead end and obstacle feature point pattern represented by the fixed template for the dead end and obstacle detection, the dead end and obstacle detection section M108 judges the candidate dead end and obstacle feature point as a left dead end and obstacle feature point (Step S110).

The dead end and obstacle detection section M108 scans the pixels from the first row to the m1-th row as the dead end and obstacle detection scanning region A103, by one row at a time, from the central position of the image in the right direction. That is, the pixels from the (n/2)-th column to the n-th column are scanned in this order. At this time, the dead end and obstacle detection section M108 detects the pixel whose binary number represents the black "1" as a candidate dead end and obstacle feature point, among the pixels from the first row to the m1-th row. The dead end and obstacle detection section M108 performs a pattern matching of the detected candidate dead end and obstacle feature point by using the fixed template for the dead end and obstacle detection. In the pattern matching, if the candidate dead end and obstacle feature point "1" matches with the preset dead end and obstacle feature point pattern represented by the fixed template for the dead end and obstacle detection, the dead end and obstacle detection section M108 judges the candidate dead end and obstacle feature point as a right dead end and obstacle feature point (Step S111).

The dead end and obstacle detection section M108 generates dead end and obstacle information and outputs it to the automatic driving system M200 (Step S116). The dead end and obstacle information indicates whether the obtained dead end and obstacle feature point (the right dead end and obstacle feature point and the left dead end and obstacle feature point) exists on the right side from the central position of the image, or exits on the left side, or exits on both the right and left sides, or does not exist on both the right and left sides.

[Comparison]

Here, an on-vehicle image processing apparatus M100 according to an embodiment of the present invention and a referential example of an on-vehicle image processing apparatus (a lane marking recognizing apparatus and a vehicle obstacle detecting apparatus) are compared.

[Comparison 1]

In an on-vehicle image processing apparatus M100 according to an embodiment of the present invention, scanning regions each of which is dedicated to any of the types of feature points on a road (a lane division line, a branch, a dead end and an obstacle) are set for the detection image data (the feature point detection image data). Thus, the amount of the scanning process can be reduced compared with a case in which whole image is scanned for all types of feature points.

In an on-vehicle image processing apparatus in according to a referential example (particular, a lane marking recognition apparatus), as the process for detecting patterns like a lane marking, a branch, a dead end and an obstacle, the entire region of the image are scanned with performing the matching of the scanned pixels and fixed templates each of which is corresponding to the patterns. In this case, the entire region is scanned, which results in a problem that the amount of the processes when the scanning is carried out becomes large, correspondingly to the frame size of the image.

On the other hand, in the on-vehicle image processing apparatus M100 according to an embodiment of the present invention, the whole area of the detection image data is divided into the lane division line detection scanning region A101, the branch detection scanning region A102 and the dead end and obstacle detection scanning region A103. Then, the lane division line detection section M106, the branch detection section M107 and the dead end and obstacle detection section M108 scan the pixels in the lane division line detection scanning region A101, the branch detection scanning region A102 and the dead end and obstacle detection scanning region A103, by one row at a time, respectively. In this way, in the on-vehicle image processing apparatus M100 of this embodiment, a detection image data is divided into the lane division line detection scanning region A101, the branch detection scanning region A102 and the dead end and obstacle detection scanning region A103. Thus, the amount of the information processed in the scanning can be reduced.

Also, the distance between the vehicle and the point corresponding to the m rows and n columns pixels of the detection image data becomes shorter from the first row to the m-th row, in this order. Also, 1<m1<m2<m is assumed. In this case, the dead end and obstacle detection scanning region A103, the branch detection scanning region A102 and the lane division line detection scanning region A101 correspond to the pixels from the first row to the m1-th row, the pixels from the (m1+1)-th row to the m2-th row, and the pixels from the (m2+1)-th row to the m-th row, among the m rows and n columns pixels of the detection image data, respectively. Consequently, there are the following merits.

Firstly, the feature of the image (the perspective of the image, namely, the near side appears large and the far side appears small) is used to specify the scanning region based on the target object to be detected. Thus, in the scanning region, the influence of noises can be suppressed and erroneous detection of feature points can be reduced.

Secondly, the lane division line detection scanning region A101 is set at the nearest side (the lower side region of the image). Thus, even when the vehicle is largely deviated from the center of a lane, or runs on a curve, at least a part of a lane division line can be imaged. Hence, it is easy to carry out the process for calculating the vehicle position.

Thirdly, the region far from the vehicle is scanned for detecting the dead end and obstacle, so that the existence or absence of a dead end or an obstacle can be recognized earlier than the existence or absence of a branch. Thus, when the automatic driving system M200 controls the motion of the vehicle in response to the detected feature points, it becomes easy to carry out the judgment for controlling the vehicle movement in response to the existence or absence of a dead end or an obstacle.

In this way, in the on-vehicle image processing apparatus M100 of this embodiment, because of the arrangement of the dedicated scanning regions, the influence of noise can be suppressed and erroneous detection of feature points can be reduced. Thus, the amount of the information processed in scanning can be reduced. For example, when the scanning region is defined as ⅓ of the entire image, the amount of the information to be processed is also ⅓.

[Comparison 2]

In an on-vehicle image processing apparatus M100 of this embodiment, for a left side pixel or a right side pixel positioned on a lane division line but is not detected, the pixel positioned in the center of the left half or right half region is complemented as the complemented lane division line feature point. Thus, the vehicle position currently estimated can be made close to the true vehicle compared with a case in which the complementation is not carried out.

In a referential example of an on-vehicle image processing apparatus which does not have a complementation function, when a vehicle is running, a lane division line extending from lower left to upper right positioned in the left side of the vehicle and another extending from lower right to upper left positioned in the right side of the vehicle are imaged. The current vehicle position is recognized based on the amount of disposition from the center of the image in a lateral direction obtained in accordance with the positions of the left and right lane division lines which are calculated by matching a pair of the edge of the right lane division line and the left lane division line to a fixed template. However, in the case when the vehicle position is widely deviated from the lane or when the vehicle is running a curve, only one of the right and left lane division lines is imaged. As a result, a pair edge of the left and right lane division lines is not detected in the matching using the fixed template, so that the vehicle position cannot be calculated.

Here, in the referential example of an on-vehicle image processing apparatus without the complementation function (in particular, a lane marking recognizing apparatus), tentative lane division line position is defined based on the position of the pair edge composed of the up-edge and the down-edge. However, unless an extrapolating circuit for detecting a pair edge by scanning in further right and left direction from the image field is installed, the position of the lane division lines cannot be obtained. In an automatic driving, this disables the running. On the other hand, the installation of a complementation circuit results in a problem that the circuit scale is increased.

On the other hand, according to an on-vehicle image processing apparatus M100 of an embodiment of the present invention, a complementation process is carried out as below. When scanning the pixels on the lane division line detection scanning region A101 are scanned by one row at a time, it is assumed that only one of the left side and right side lane division line feature points is detected and the other is not detected. In the following, the left or right half region in which the other lane division line feature point being not detected is positioned therein is referred to as the feature point lacking half region. The feature point lacking half region is either the left half region composed of the pixels from the (n/2)-th column to the first column or the right half region, and the right half region composed of the pixels from the (n/2)-th column to the n-th column. In this case, the center position in the lateral direction in the feature point lacking half region is defined as the complemented lane division line feature point of the half region.

Then, the position of the vehicle on the road is estimated in accordance with one lane division line feature point in a half region and the complemented lane division line feature point in the other half region. In this way, in the on-vehicle image processing apparatus M100 of this embodiment, in the feature point lacking half region, the complemented lane division line feature point is complemented in the feature point lacking half region. As a result, the deviation of the estimated vehicle position from the true vehicle position can be reduced. Consequently, there are following merits.

Figure 7A:
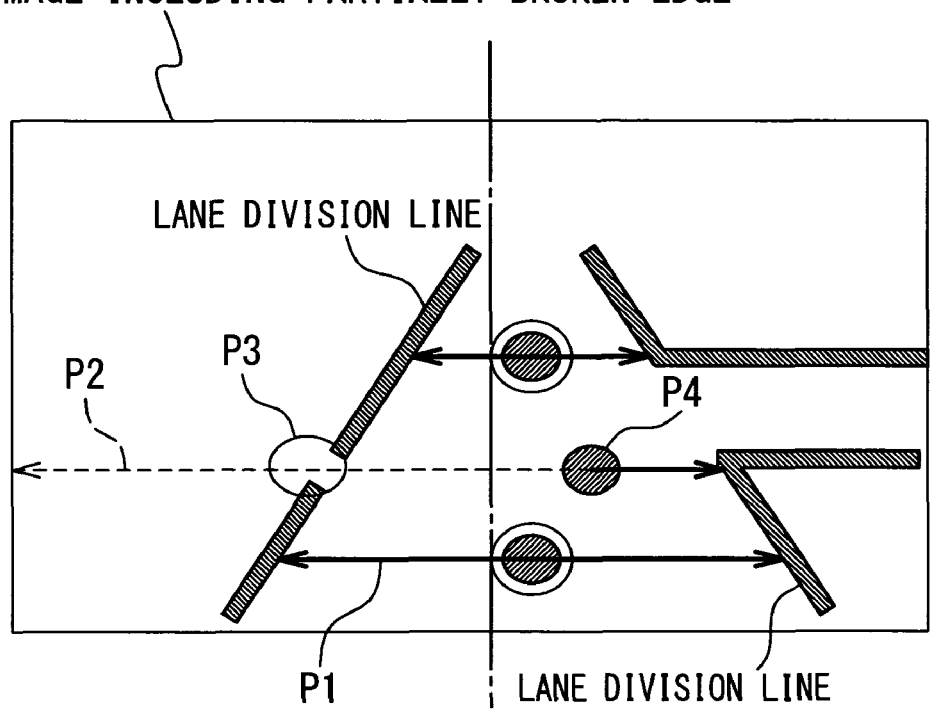
FIG. 7A is a view describing an effect when the step S112 is executed.

Firstly, as shown in FIG. 7A, for the image in which an edge is lost, the deviation is reduced. The arrow P1 indicates that in the row in the half region, an edge is detected. The dotted arrow P2 indicates that in the row in the half region, an edge is not detected. The circle P3 indicates the current vehicle position calculated from detected edges. The black circle P4 indicates the current vehicle value roughly estimated from a detected edge and an edge obtained by the complementation process for complementing the lacking lane division line feature point.

Figure 7B:
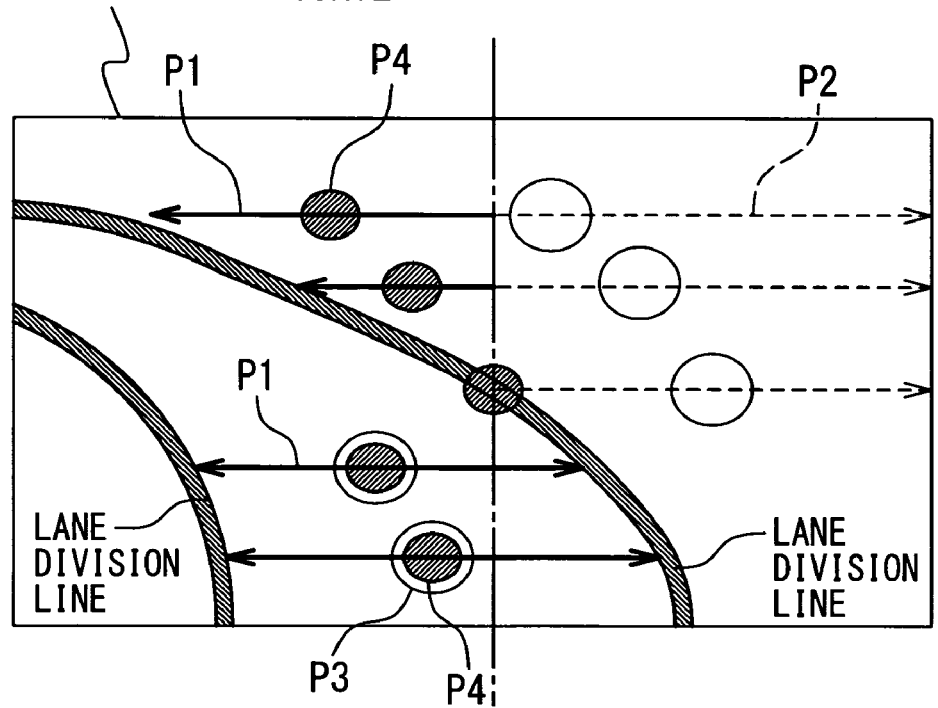
FIG. 7B is a view describing an effect when the step S112 is executed.

Secondly, as shown in FIG. 7B and FIG. 7C, even when a vehicle is running through a curve, or when a vehicle is largely deviated from the center of a lane, in an automatic driving, by calculating the true vehicle position based on the complemented edge, the automatic driving in a course closer to a desired course can be achieved.

For example, in FIG. 7B, an image in the case that the vehicle is running in a curve is shown. In FIG. 7C, an image in the case that the vehicle is largely deviated from the center of a lane is shown. In these cases, the vehicle is positioned in the right side of the lane and the driving to control the vehicle to the left direction is desired. However, if the complementation explained above is not performed, the vehicle position is judged to be in a left side of the lane. In the on-vehicle image processing apparatus M100 in this embodiment, although there is a slight deviation from the true vehicle position, it is possible to judge the vehicle position to be in the right region of the lane.

In this way, the on-vehicle image processing apparatus M100 in this embodiment has a wide allowable range for noises, the deviation of the vehicle position and the deviation of the installed position of the camera. Thus, the vehicle position can be calculated by using an edge detection based on a fixed template without adding an extra circuit or an extra process.

[Comparison 3]

In an on-vehicle image processing apparatus M100 of an embodiment of the present invention, the number of circuits for attaining a filtering process for the edge detection can be reduced. Thus, the circuit scale can be reduced.

In a referential example of an on-vehicle image processing apparatus (in particular, in an apparatus for detecting an obstacle on a lane), two kinds of one dimensional filtering processes are executed, namely, the horizontal (lateral) and the vertical (longitudinal) edge detection filtering processes. Thus, in this referential technique, the circuit for attaining the one-dimensional space filtering processes of the two kinds is required, so that there is a problem that the circuit scale is increased.

On the other hand, in the on-vehicle image processing apparatus M100 of an embodiment of the present invention, the filtering process can be attained by using only one two-dimensional space filtering process. That is, it can be attained only by adding a circuit for attaining one two-dimensional space filtering process. Thus, the circuit scale can be reduced compared with the referential example.

Also, in an embodiment of the present invention, the two-dimensional space filtering process can be executed on the basis of only the intensities of the focused pixel and the surrounding 8 pixels. Therefore, in order to attain the two-dimensional space filtering process, it is enough to prepare only 3 line buffers, which is in the half size of the referential example. For example, when the number of the line buffers required in the referential example of the on-vehicle image processing apparatus is 6, the number of the line buffers required in the on-vehicle image processing apparatus M100 of an embodiment of the present invention is 3. Here, in one line buffer, the number of necessary flip-flops is increased correspondingly to the image size (lateral width) in 1 frame. Thus, in the case of the image size of 1000*1000 [pixel] per 1 frame, this results in the reduction in the number of 3000 flip-flops.

Merely reducing the number of the space filter processing circuits may result in the decrease in the precision of the image processing. However, according to the on-vehicle image processing apparatus M100 of an embodiment of the present invention, the compensation of a lacking edge and the noise reduction can be performed at a same time. Thus, the image of the high precision in which a lack of an edge of a lane division line is compensated and noise is reduced can be obtained, so that a feature point on the road can be detected in which erroneous operations are suppressed, similarly to the referential example of the on-vehicle image processing apparatus.

Moreover, in the referential on-vehicle image processing apparatus (in particular, an apparatus for detecting an obstacle on a lane), after the execution of the two kinds of one-dimensional space filtering processes, namely, the horizontal and the vertical edge detection filtering processes, in accordance with the execution result, a slant line is detected by a slant line edge detecting process in an obstacle judging means. Thus, in the referential example, a circuit for attaining two kinds of one-dimensional space filtering processes and the slant line detecting process is required. Hence, there is a problem that the circuit scale is increased.

On the other hand, in the on-vehicle image processing apparatus M100 of an embodiment of the present invention, the slant line edge detecting process is not required, and the number of the processes and the circuit scale can be reduced.

[Effect]

As mentioned above, according an on-vehicle image processing apparatus M100 according to embodiments of the present invention, the scanning regions dedicated to the kinds of feature points (the lane division line, the branch, the dead end and the obstacle) on the road is set for the feature point detection image data. Thus, the number of the information to be processed when the scanning is carried out can be reduced.

In an on-vehicle image processing apparatus M100 according to an embodiment of the present invention, for the pixel in the left or right half region in which a lane division line feature point cannot be detected, the central pixel of the half region is complemented as the complemented lane division line feature point. Thus, the vehicle position that is currently estimated can be made closer to the true vehicle position.

According to an on-vehicle image processing apparatus M100 according to an embodiment of the present invention, the number of the circuits for attaining the filtering process for the edge detection can be reduced so that the circuit scale can be reduced.

Although the present invention has been described above in connection with several embodiments thereof, it would be apparent to those skilled in the art that those embodiments are provided solely for illustrating the present invention, and should not be relied upon to construe the appended claims in a limiting sense.

What is claimed is:

1. An on-vehicle image processing apparatus comprising:
an image taking apparatus configured to generate image data by taking an image of a forward view of a vehicle;
an edge detection section configured to generate a detection image data including pixels of m rows and n columns (m and n are integers more than 2) based on the image data; and
a feature point detection section configured to detect at least one feature point based on the detection image data and output the at least one feature point to an output apparatus,
the feature point detection section categorizes the at least one feature point into a lane division line feature point indicating a point on a lane division line, a branch feature point indicating a branch of a lane, and a dead end and obstacle feature point indicating a dead end of a lane or an obstacle on a lane,
the detection image data includes a lane division line detection scanning region set for detecting the lane division line feature point, a branch detection scanning region set for detecting the branch feature point, and a dead end and obstacle detection scanning region set for detecting the dead end and obstacle feature point,
a distance between a vehicle loading the image taking apparatus and a position on a lane corresponding to a pixel in the detection image data becomes shorter from a first row to a m-th row of the detection image data, and
the dead end and obstacle detection scanning region is set in pixels positioned from the first row to a m1-th row of the detection image data, the branch detection scanning region is set in pixels positioned from the m1-th row to a m2-th row of the detection image data, and the lane division line detection scanning region is set in pixels positioned from the m2-th row to the m-th row of the detection image data, wherein $1<m1<m2<m$.

2. The on-vehicle image processing apparatus according to claim 1, wherein the feature point detection section includes:
a lane division line detection section configured to detect the lane division line by scanning the lane division line detection scanning region;
a branch detection section configured to detect the branch feature point by scanning the branch detection scanning region; and a dead end and obstacle detection section configured to detect the dead end and obstacle feature point by scanning the dead end and obstacle detection scanning region.

3. The on-vehicle image processing apparatus according to claim 2, wherein the lane division line detection section is configured to judge the lane division line feature point positioned in a left region of the detection image data as a left side lane division line feature point, and judge the lane division line feature point positioned in a right region of the detection image data as a right side lane division line feature point, and
the feature point detection section further includes:
a vehicle position estimation section configured to estimate a position of a vehicle loading the image taking apparatus based on the left side lane division line feature point and the right side lane division line feature point.

4. The on-vehicle image processing apparatus according to claim 3, wherein the lane division line detection section is configured to scan pixels in the lane division line detection scanning region by one row at a time,
and when one of the left side lane division line feature point and the right side lane division line feature point on a certain row is detected and another one of the left side lane division line feature point and the right side lane division line feature point on the certain row is not detected, define a left or right half region in which the lane division line feature point is not detected as a feature point lacking half region, and
generate a complemented lane division line feature point positioned in a center of the feature point lacking half region in a scanning direction, and
the vehicle position estimation section is configured to estimate a position of a vehicle loading the image taking apparatus based on a left side or right side lane division line feature point detected on the certain row and the complemented lane division line feature point.

5. The on-vehicle image processing apparatus according to claim 1, wherein the edge detection section is configured to:
calculate a weighted average of an intensity of a focused pixel and intensities of surrounding pixels surrounding the focused pixel by taking each of the pixels of m rows and n columns as the focused pixel;
perform a two-dimensional space filtering by generating a filtered image data including filtered pixels, each of the filtered pixels has an intensity determined based on the weighted average; and
generating a binarized filtered image data by binarizing each of pixels in the filtered image data by using a threshold intensity value.

6. The on-vehicle image processing apparatus according to claim 5, wherein the edge detection section is configured to perform the two-dimensional space filtering by using a smoothing filter wherein the intensity of the focused pixel and the intensities of surrounding pixels are equal, or a laplacian filter.

7. The on-vehicle image processing apparatus according to claim 5, wherein each of the pixels in the binarized filtered image data has a first pixel value or a second pixel value, and
the lane division line detection section is configured to detect a pixel having the first intensity as a candidate lane division line feature point, and judge the candidate lane division line feature point as the lane division line feature point when the candidate lane division line feature point is matched with a preset lane division line feature point pattern.

8. The on-vehicle image processing apparatus according to claim 5, wherein each of the pixels in the binarized filtered image data has a first pixel value or a second pixel value, and
the branch detection section is configured to detect a pixel having the first intensity as a candidate branch feature point, and judge the candidate branch feature point as the branch feature point when the candidate branch feature point is matched with a preset branch feature point pattern.

9. The on-vehicle image processing apparatus according to claim 5, each of the pixels in the binarized filtered image data has a first pixel value or a second pixel value, and
the dead end and obstacle detection section is configured to detect a pixel having the first intensity as a candidate dead end and obstacle feature point, and judges the candidate dead end and obstacle feature point as the dead end and obstacle feature point when the candidate dead end and obstacle feature point is matched with a preset dead end and obstacle feature point pattern.

10. The on-vehicle image processing apparatus according to claim 5, wherein each of pixels of the binarized filtered image data has a binary value of 0 or 1, and
the on-vehicle image processing apparatus further comprises an edge correction and noise reduction section configured to:
count value 0 pixel having the binary value of 0 and value 1 pixel having the binary value of 1 among a focused binary pixel and surrounding binary pixels surrounding the focused binary pixel, by taking each of the pixels of the binarized filtered image data as a focused binary pixel;
generate a feature point detection image data by performing an edge correction and noise reduction process in which the binary value is replaced by a new binary value, wherein the new binary value is determined by a proportion of the counted number of the value 0 pixel to the counted number of the value 1 pixel, and a predetermined condition of an arrangement of the value 0 pixel and the value 1 pixel of the surrounding binary pixels for each of the focused binary pixel; and
output the feature point detection image data to the feature point detection section as the detection image data.

11. The on-vehicle image processing apparatus according to claim 1, further comprising:
a memory; and
A/D converter configured to convert the image data generated by the image taking apparatus which is an analogue data into a digital data and stores the digital data in the memory,
wherein the edge detection section is configured to generate the detection image data from the digital data stored in the memory.

12. The on-vehicle image processing apparatus according to claim 1, wherein the output apparatus is an automatic driving system for controlling a motion of a vehicle loading the image taking apparatus in response to the at least one feature point.

13. An image processing apparatus comprising:
an edge detection section configured to generate a detection image data including pixels of m rows and n columns (m and n are integers more than 2) by applying an image processing to an image data which is an image of a forward view of a vehicle;
a feature point detection section configured to detect at least one feature point based on the detection image data and output the at least one feature point to an output apparatus, the feature point detection section categorizes the at least one feature point into a lane division line feature point indicating a point on a lane division line, a branch feature point indicating a branch of a lane, and a dead end and obstacle feature point indicating a dead end of a lane or an obstacle on a lane, the detection image data includes a lane division line detection scanning region set for detecting the lane division line feature point, a branch detection scanning region set for detecting the branch feature point, and a dead end and obstacle detection scanning region set for detecting the dead end and obstacle feature point, a distance between a vehicle loading the image taking apparatus and a position on a lane corresponding to a pixel in the detection image data becomes shorter from a first row to a m-th row of the detection image data, and the dead end and obstacle detection scanning region is set in pixels positioned from the first row to a m1-th row of the detection image data, the branch detection scanning region is set in pixels positioned from the m1-th row to a m2-th row of the detection image data, and the lane division line detection scanning region is set in pixels positioned from the m2-th row to the m-th row of the detection image data, wherein $1<m1<m2<m$.

* * * * *